United States Patent [19]

Tarasuk et al.

[11] 4,146,431
[45] Mar. 27, 1979

[54] NUCLEAR FUEL CLADDING SYSTEM

[75] Inventors: Walter R. Tarasuk, Cavan; George C. Hatton, Lakefield; William J. Penn, Peterborough, all of Canada

[73] Assignee: Canadian General Electric Company Limited, Toronto, Canada

[21] Appl. No.: 726,181

[22] Filed: Sep. 24, 1976

Related U.S. Application Data

[63] Continuation-in-part of Ser. No. 557,766, Mar. 12, 1975, abandoned.

[30] Foreign Application Priority Data

Mar. 13, 1974 [CA] Canada .................................. 194868

[51] Int. Cl.² .............................................. G21C 3/20
[52] U.S. Cl. ......................................... 176/82; 176/73
[58] Field of Search ........................ 176/93, 74, 68, 82

[56] References Cited

U.S. PATENT DOCUMENTS

| | | | |
|---|---|---|---|
| 2,990,352 | 6/1961 | Finniston et al. | 176/82 |
| 3,085,059 | 4/1963 | Burnham, Jr. | 176/82 |
| 3,119,747 | 1/1964 | Wallace et al. | 176/82 |
| 3,140,983 | 7/1964 | Waine | 176/73 |
| 3,376,201 | 4/1968 | Bain | 176/73 |
| 3,801,451 | 4/1974 | Scharf | 176/74 |
| 3,804,708 | 4/1974 | Nilson | 176/68 |
| 3,901,761 | 8/1975 | Wood | 176/82 |
| 3,925,151 | 12/1975 | Klepfer | 176/82 |

FOREIGN PATENT DOCUMENTS

| | | | |
|---|---|---|---|
| 1244632 | 12/1960 | France | 176/73 |
| 958697 | 5/1964 | United Kingdom | 176/73 |
| 1048590 | 11/1966 | United Kingdom | 176/82 |
| 1225970 | 3/1971 | United Kingdom | 176/82 |

Primary Examiner—Harvey E. Behrend
Attorney, Agent, or Firm—R. A. Eckersley

[57] ABSTRACT

Pencil type nuclear fuel elements having a metallic, locally flexible cladding containing discrete fuel pellets in end-to-end packed relation to form a stack of fuel pellets, wherein the pellets are provided with individual expansion provision, to substantially preclude longitudinal expansive movement, are provided with a boundary coat of non-bonding lining material interposed between the pellets and the cladding, to promote peripheral creep of the cladding, relative to the pellets, to reduce the incidence of rupture failure extending longitudinally of the cladding or sheath, due to zero gauge lengths expansion stresses.

2 Claims, 5 Drawing Figures

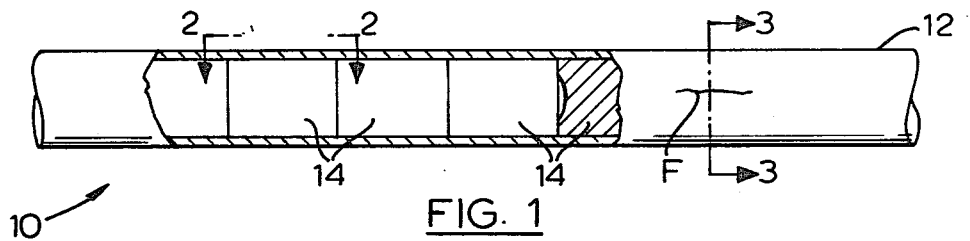
FIG. 1
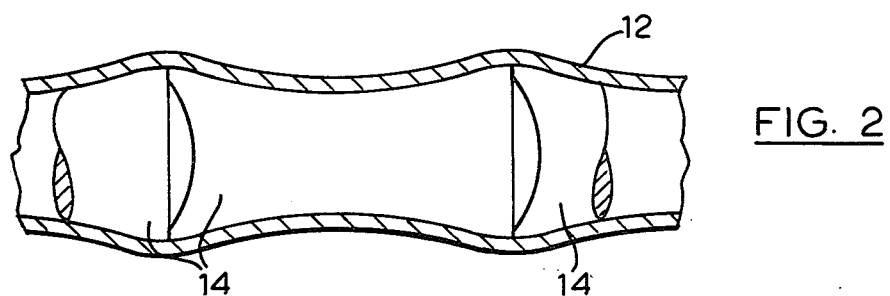
FIG. 2
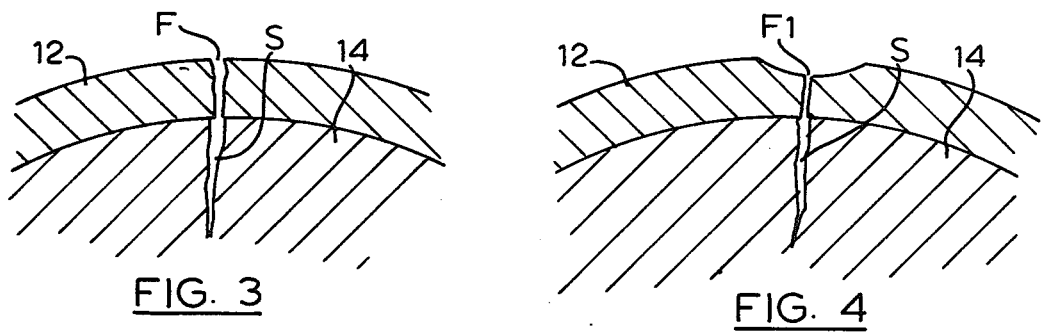
FIG. 3
FIG. 4
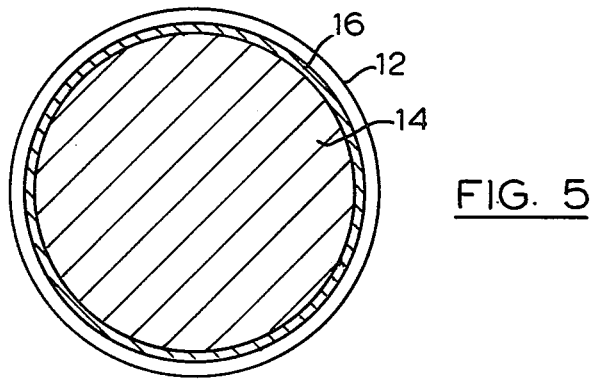
FIG. 5

NUCLEAR FUEL CLADDING SYSTEM

This application is a continuation-in-part of Application Ser. No. 557,766 filed Mar. 12, 1975 now abandoned.

This invention is directed to a nuclear fuel element for use in a nuclear reactor, and in particular to an element embodying a non-bonding layer to assist in the prevention of zero gauge length rupture failure of the element sheath.

In the operation of rodded fuels in different types of nuclear reactor, the types of clad, the normal mode of operation, and the specifics of the fuel all influence the duty to which the fuel is exposed.

In the operation of boiling water reactors utilizing fuel rods having substantially rigid, self-supporting sheaths of the type shown in U.S. Pat. No. 3,119,747 issued Jan. 28, 1964, Wallace et al, there is taught the use of a lubricant layer within the sheath, to prevent "ratcheting". In this prior type of fuel element, a single elongated fuel body, having a length in the order of 14 inches or so is provided with a gradual end taper, extending over an end length of about 2 inches, and having lubricant thereat to preclude cummulative sequential expansion of the tube or sheath that leads ultimately to failure by way of a circumferentially extending tear. This failure occurs due to the displacement longitudinally within the sheath of one end of the fuel body each time that the reactor goes on load and the fuel material expands longitudinally to a greater extent than the sheath. An end clearance is provided in order to accept this differential axial fuel expansion, but due to interaction between fuel and sheath, local seizing occurs and the sheath becomes expanded axially, sometimes to the point where it is no longer self-supporting under the external pressure of coolant. This then may lead to failure of the fuel sheath by the generation of peripherally extending cracks or tears adjacent the end of the fuel.

Owing to the use of a rigid, self-supporting sheath of the type employed in boiling water reactors, the sheath of Wallace et al is not pressed onto the fuel pellets in close gripping relation therewith by the externally applied pressure of the coolant.

Also, in this type of prior arrangement, the efficiency of the core arrangement is not of paramount importance, owing to the use of enriched fuel, whereby any deficiency in the fuel charge due to clearances, tolerances or other modifying criterea can be overcome by effecting a variation in the degree of fuel enrichment.

The present invention is directed to a quite different problem of sheath failure that may make itself evident as an axially extending rupture and may be encountered in fuel for reactors of the CANDU type. This type of reactor usually utilizes thin walled locally flexibly sheathed fuel elements having sheaths that are not generally self-supporting, and containing fuel usually comprising short pellets in the order of an inch or so in length, where under conditions of thermal expansion peripheral expansion of individual pellets, relative to the sheath becomes localized so that the sheath may not expand uniformly along the fuel periphery of the pellet, and it has been found that the requisite peripheral sheath expansion necessary to accommodate pellet growth takes place over a much reduced gauge length of the sheath periphery. This can lead to tensile failure of the sheath, with a consequent generation of axially extending tears and the like in the sheath.

In the prior art it is well known to provide a lubricating layer, as in the case of Wallace et al, to protect against longitudinal ratcheting seizure. Alternatively, the provision of indentations in the ends of fuel pellets, to accept differential thermal expansion is also well known. It would indeed be a redundancy to combine both these forms of expansion-countering provision in the same nuclear fuel element. Such a redundancy would be strenuously avoided in designing fuel for a CANDU reactor, due to the critical effect of core design parameters on fuel elements which depend on natural uranium, $UO_2$, and may not rely upon changes to enrichment to accommodate in fuel design changes. Accordingly, it is affirmed that a synergistic effect is obtained in providing in a natural uranium nuclear fuel element the provisions of axial expansion allowances in the fuel pellets, to preclude ratcheting, combined with a barrier layer of non-bonding material to preclude minimal peripheral gauge length hang-up and to prevent longitudinal tears generating in the sheath.

Nuclear fuel provision for CANDU type reactors is very sensitive to any factors which detract from the mass of the fuel charge, or reduce the neutron flux, owing to the utilization of so-called "natural uranium" $UO_2$, which contains no enrichment and therefore provides a standard, predetermined fuel content per unit volume, with no capability for varying enrichment, as in the case of enriched fuel.

Owing to the tendency for fuel pellets to change their shape by "hourglassing" to a non-cylindrical form, the locally flexible thin walled sheaths tend to closely wrap the hourglass-shaped pellets, thereby substantially precluding differential axial expansion between pellet and sheath. Also the provision of an individual axial expansion allowance for each pellet, by indenting the pellet end, tends to preclude cumulative differential axial expansion between pellet and sheath, known as ratcheting. The present invention provides a non-bonding interface within the fuel, to preclude or substantially reduce the incidence of failures due to concentrated differential expansion in a peripheral sense, which leads to the application of excessive hoop stresses over a very limited gauge or minimal gauge length, referred to as "zero gauge-length failure".

The present invention thus provides an elongated slender fuel element of cylindrical form having a locally flexible metallic sheath, a plurality of close-fitting nuclear fuel pellets in end-to-end stacked array therein, having longitudinal expansion relief provision in the ends of at least some pellets to substantially preclude differential axial expansion between pellet and sheath in operation, and a non-bonding lining layer interposed between the pellets and the sheath at the peripheral adjoining surfaces thereof to facilitate peripheral distribution of stresses in the sheath to reduce the likelihood of rupture failures extending longitudinally of the sheath due to a concentration of peripheral sheath expanding stresses, operating over a minimal gauge length.

Certain embodiments of the invention are described, reference being made to the accompanying drawings wherein:

FIG. 1 shows a fuel element according to the prior art;

FIG. 2 is a diametrical part section at 2—2 of FIG. 1;

FIG. 3 is a transverse part section at 3—3 of FIG. 1, showing a first type of sheath failure;

FIG. 4 is a similar view to FIG. 3, showing a second type of sheath failure; and FIG. 5 is a transverse section of a fuel element embodying the present invention.

In FIG. 1, the fuel element 10 has an outer cylindrical sheath 12, generally of thin zirconium alloy such as that, trademarked "Zircaloy", of such thickness as to deform in peripheral and axial gripping relation with the pellets 14 under operating conditions within a reactor.

Referring to FIG. 2, this shows in exaggerated fashion the manner in which the pellets 14 tend to change from their original cylindrical form to the "hourglass" shape illustrated, while the sheath 12 also conforms thereto under reactor operating conditions. It will be understood that coolant pressures in the order of 1500 psi are applied to the outside of the fuel sheath 12.

Referring to FIG. 3, one type of fuel failure illustrated, which usually occurs at a site S of a pellet fracture, results in failure at F of the sheath 12, with substantially no change in cross-sectional area of the sheath 12. In the type of failure illustrated in FIG. 4, there is necking at the failure site $F_1$, resulting in a reduction of the cross-section of sheath 12 at the failure site.

FIG. 5 shows a cross section of a fuel element according to the present invention, having a bond preventing layer 16 interposed between the sheath 12 and the pellet 14.

The layer 16 comprises material selected from the group consisting of siloxane, silicon and graphite, and characterized by substantial intertness under irradiation of reactor intensity, together with maintenance of high stree distributing capability at reactor operating temperatures and possessing a non-bonding nature, while being fairly readily applied to the interior of the sheath 12 or the surface of fuel pellets 14, dry or in the form of liquid or emulsion which is subsequently dried.

These materials do not operate in the accepted sense as lubricants, but provide an interposed non-bonding layer to effectively reduce the tendency of the pellet and sheath to effect a peripheral hang-up. Thus the creation of minimal gauge length hoop stress conditions may be effectively countered.

What we claim as new and desire to secure by Letters Patent of the United States are:

1. In an elongated slender nuclear fuel element for use in a nuclear reactor, the element being of cylindrical form and having a locally flexible metallic sheath, a plurality of close-fitting nuclear fuel pellets of non-enriched $UO_2$ in end-to-end stacked array therein, said sheath being deformable under normal operating pressure within a reactor into both axial and peripheral pellet gripping relation, the majority of said pellets each having at least one end thereof recessed to provide axial expansion relief, to accommodate individual axial pellet expansion in operation and to substantially preclude longitudinal ratcheting of the sheath due to differential axial expansion between pellet and sheath, the improvement comprising a non-bonding lining layer interposed between the pellets and the sheath on the peripheral adjoining surfaces thereof to facilitate peripheral distribution of stresses in the sheath to substantially preclude longitudinally extending rupture failure of the sheath due to peripheral stresses operating over a minimal peripheral gauge length.

2. A fuel element according to claim 1 wherein said non-bonding layer is selected from the group consisting of graphite, siloxane and silicon.

* * * * *